Feb. 17, 1925.
P. O. ECKELS
STEERING GEAR CONTROL
Filed Jan. 7, 1924
1,526,905
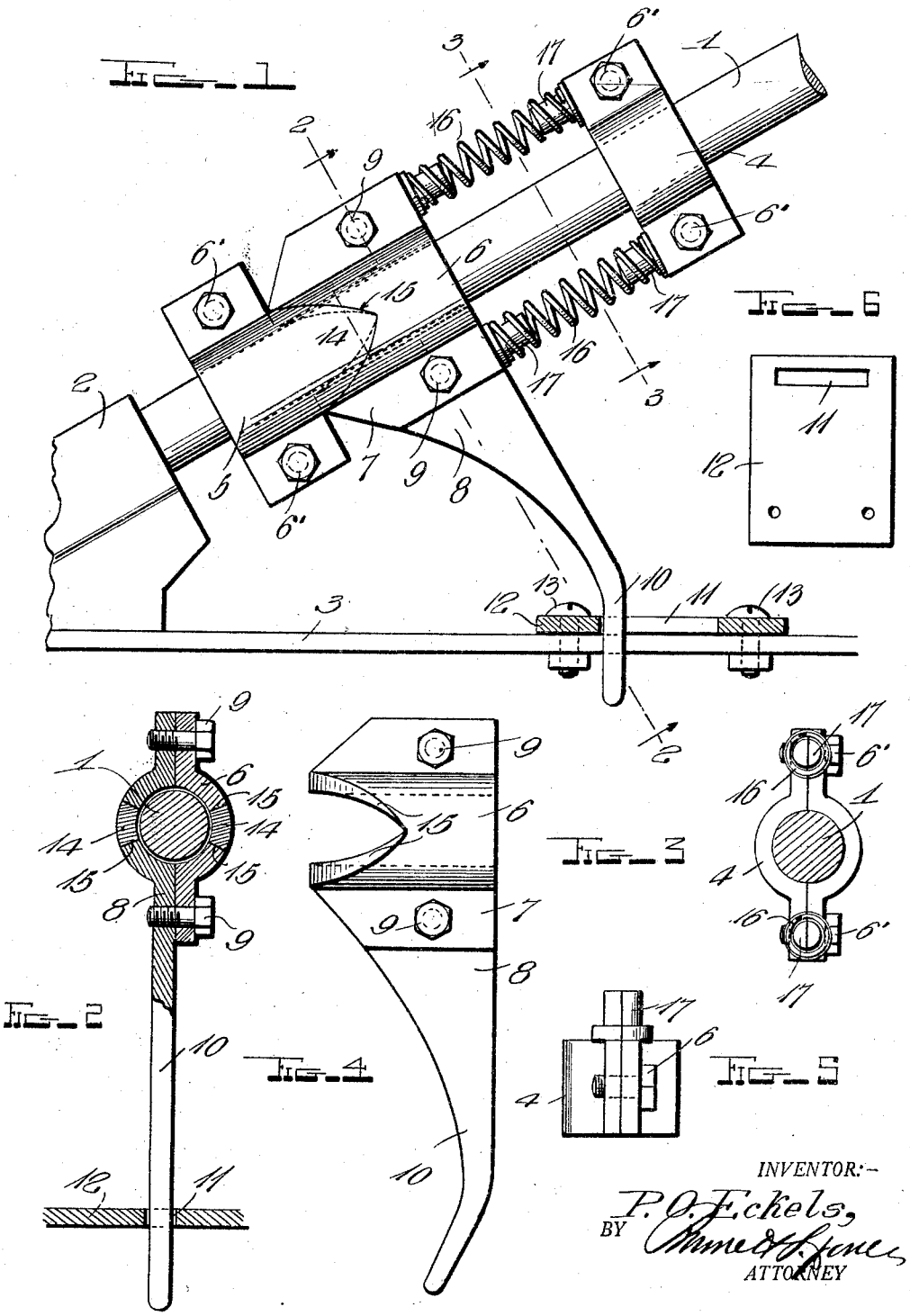

Patented Feb. 17, 1925.

1,526,905

UNITED STATES PATENT OFFICE.

PARL O. ECKELS, OF TULSA, OKLAHOMA.

STEERING-GEAR CONTROL.

Application filed January 7, 1924. Serial No. 684,834.

*To all whom it may concern:*

Be it known that I, PARL O. ECKELS, a citizen of the United States, residing at Tulsa, in the county of Tulsa and State of Oklahoma, have invented new and useful Improvements in Steering-Gear Controls, of which the following is a specification.

This invention relates to steering gear control devices for automobiles, and particularly to means acting upon the steering column of the automobile to assist the driver in holding the front wheels in line with the rear wheels for steering control at all times except when this alinement is altered by manual turning of the steering wheel.

One object of the invention is to provide a steering gear control device which is simple of construction, reliable and efficient in action and capable of being installed and maintained in working order at a low cost, and which will operate to relieve the driver from the hand and arm strains occasioned by the tendency of the front wheels to turn in one direction or the other out of a straight line, particularly when the vehicle is traveling over rough roads.

A further object of the invention is to provide a device of the character described which may be applied to steering gears of that kind devoid of the convenience and safety of action afforded by worm steering devices, and which will give all the comfort and safety of action afforded in the driving of cars having worm steering devices.

The invention consists of the features of construction, combination and arrangement of parts, hereinafter fully described and claimed, reference being had to the accompanying drawing, in which:

Figure 1 is a side elevation of a portion of a car and a portion of the steering column of a steering mechanism, showing the application of my invention thereto.

Figure 2 is a vertical transverse section on the line 2—2 of Figure 1.

Figure 3 is a vertical transverse section on the line 3—3 of Figure 1.

Figure 4 is a side view of the sliding clutch member or sleeve of the control device.

Figure 5 is a plan view of the stationary abutment collar thereof.

Figure 6 is a plan view of the anchor plate.

Referring now more particularly to the drawing, 1 designates a portion of the steering column of a steering gear, 2 the steering column journal bracket, and 3 a portion of the body of the vehicle, which may be the floor of the driver's compartment or a portion of the chassis or frame structure. In practice, the column 1 is provided with the usual hand wheel or its equivalent and is suitably coupled to the front steering rod whereby the front wheels of the vehicle are swung upon the steering knuckles for steering actions.

In carrying my invention into practice, I provide upon the steering column 1 an upper abutment collar 4 and a lower collar or sleeve 5, between which is arranged for movement a sliding sleeve member 6. The collars 4 and 5 are preferably made in halves or sections suitably shaped to embrace the column 1, and which halves or sections are united by bolts or other suitable fastenings 6', whereby said collars are clamped to the column 1 so as to be fixed against motion thereon.

The members 5 and 6 form the fixed and movable elements of a clutch device and, as shown, the member 6 is fitted to slide loosely back and forth on the column 1 and is made of two sections 7 and 8 united by bolts or other suitable fastenings 9, adapting said sections to be readily assembled about the column and disassembled for removal therefrom. One of these sections, as the section 8, is provided with a detent arm 10. This arm 10 projects downwardly through and is movable in a slot 11 in an anchor plate 12 bolted or otherwise suitably secured to the body or frame element 3. The slot 11 extends lengthwise in the same direction as the column 1, that is, lengthwise of the vehicle, and permits movement of the sleeve 6 in such direction only, the plate 12 serving to hold the sleeve 6 from lateral or sidewise oscillating movements on the column 1. The plate 12 is firmly secured by bolts or other suitable fastenings 13 to the frame or body member 3.

The clutch members 5 and 6 are provided with inter-engaging clutch surfaces, the member 5 having clutch lugs 14 engaging clutch recesses 15 in the member 6. The engaging surfaces of these lugs and recesses are shaped on spiral lines so that, while the lugs 14 are permitted to turn in one direction or the other in the recesses 15, as the column 1 is turned in one direction or the other, such action will be secured only through recession of the member 6, thus establishing a decided and effective resistance to any turning motion of the column 1 in either direction under leverage exerted by turning movements of the front wheels from a direct path in the travel of the vehicle.

The rearward movement of the sleeve 6 is resisted by coiled expansion springs 16. These springs 16 are disposed between the collar 4 and the sleeve 6 and terminally engage studs 17 on the opposed faces of said collar and sleeve, whereby the springs are permitted to expand and contract, as well as to twist laterally in the lateral movements of the collar 4, without becoming inoperative or displaced from their holding studs. These springs normally serve by expansion to hold the sleeve 6 pressed forwardly and downwardly so as to constantly maintain the clutch surfaces 14 and 15 in engagement with each other.

In the operation of the device, it will be understood that the clutch members resist turning movements of the column 1 in either direction, since the clutch member 5 is not permitted to turn with the column 1 without forcing the sleeve 6 backwardly, which action is resisted by the springs 16, which constantly tend to force the sleeve 6 forward to its normal position in which the clutch members are in full engagement. The resistance thus instituted is normally sufficient to prevent deflection of the front wheels from a position in line with the rear wheels, and is particularly effective for this purpose as the amount of spring resistance is properly proportioned to oppose motion of the steering wheels out of a straight line under the leverage exerted thereby on the steering column in the travel of the vehicle through loose sand and gravel and over car tracks and rough roads, while at the same time permitting the steering column to be manually turned by means of the steering wheel without excess effort on the part of the driver. Hence the steering control device as thus constructed will relieve the driver from the hand and arm strains which must be sustained in driving cars of that type in which the steering gear is unprovided with any means, such as worm gearing, for preventing back-lash, and the device in action will effectually prevent undue movement of the steering wheels out of a direct line of travel and thus afford in steering all the advantages, comfort and safety in driving afforded by steering mechanism having worm gearing or similar safety devices for preventing back-lash.

Having thus fully described my invention, I claim:

1. In a control for automobile steering gears, a steering column, a stationary anchor plate having a slot extending in the same general direction as the column, a stationary clutch member on the column, a sliding clutch member on the column, said clutch members having spirally-shaped engaging surfaces, spring means for forcing the sliding clutch member toward the stationary clutch member, and an arm carried by said sliding clutch member and engaging the slot in the anchor plate.

2. In a control for automobile steering gears, a steering shaft, a pair of cam members on said shaft provided with coacting surfaces, each of said members being formed of two united sections adapting the same to be fitted on the shaft without removal of the shaft or disassemblage of the parts of the steering gear, one of said cam members being fixed to the shaft for rotation therewith and the other cam member being loosely mounted on the shaft for sliding motion thereon, spring means for yieldingly holding the sliding cam member in engagement with the fixed cam member and adapted to be applied without removal of the shaft or disassemblage of the parts of the steering gear, a stationary guide mounted on a part of the vehicle separate from and independent of the steering gear, and an arm carried by one of the sections of the sliding cam member and engaging said guide to permit longitudinal motion of said cam member on the shaft while holding said cam member from rotary motion.

3. In a control for automobile steering gears, a steering shaft, a bearing therefor, a pair of cam members on the shaft having interfitting cam faces, one of said cam members being arranged adjacent to the bearing and fixed to the shaft for rotation therewith and the other of said cam members being disposed on the shaft above said fixed cam member and loosely mounted on the shaft for sliding motion thereon, a collar on the shaft above said sliding cam member, spring means between said collar and the sliding cam member for holding said cam member yieldingly in engagement with the fixed cam member, a stationary guide on the vehicle separate from and supported independently of the steering gear, and a projection from said sliding cam member engaging the guide, said guide having a guideway of restricted width in which said projection is held against lateral movement and fitted to slide to permit longitudinal sliding movement only of said sliding cam member.

In testimony whereof I affix my signature.

PARL O. ECKELS.